United States Patent
Hyodo et al.

(10) Patent No.: US 11,671,708 B2
(45) Date of Patent: Jun. 6, 2023

(54) IMAGING DEVICE, CONTROL METHOD FOR IMAGING DEVICE, AND RECORDING MEDIUM

(71) Applicant: CANON KABUSHIKI KAISHA, Tokyo (JP)

(72) Inventors: Yoshimasa Hyodo, Tokyo (JP); Hideaki Nagano, Kanagawa (JP); Takuma Endo, Kanagawa (JP); Akira Egawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/667,190

(22) Filed: Feb. 8, 2022

(65) Prior Publication Data
US 2022/0264009 A1 Aug. 18, 2022

(30) Foreign Application Priority Data
Feb. 17, 2021 (JP) .............................. JP2021-023159

(51) Int. Cl.
*H04N 5/232* (2006.01)
*H04N 5/60* (2006.01)
(Continued)

(52) U.S. Cl.
CPC ........... *H04N 23/683* (2023.01); *H04N 5/607* (2013.01); *H04N 23/61* (2023.01)

(58) Field of Classification Search
CPC ............... H04N 5/23267; H04N 5/607; H04N 5/23218; H04N 5/23229; H04N 5/2628; H04N 7/183; H04N 7/185; G06K 9/00
(Continued)

(56) References Cited

U.S. PATENT DOCUMENTS 6,747,690 B2 * 6/2004 Molgaard .............. G03B 17/00
                                                348/208.1
7,583,302 B2 * 9/2009 Hoshino ................. G06T 7/223
                                                  348/241
(Continued)

FOREIGN PATENT DOCUMENTS

JP 2012-160898 A 8/2012
JP 2017-204666 A 11/2017

OTHER PUBLICATIONS

Combined Search and European Report dated Jul. 27, 2022, that issued in the corresponding European Patent Application No. 2201442.7.

*Primary Examiner* — Pritham D Prabhakher
(74) *Attorney, Agent, or Firm* — Cowan, Liebowitz & Latman, P.C.

(57) ABSTRACT

An imaging device in which an imaging sensor that captures an image and a display unit that displays the image are provided includes: an image processing unit configured to perform roll correction on the image; a control unit configured to control an output of the image; and a display control unit configured to display the output image on the display unit. The image processing unit performs the roll correction such that a degree of correction of the roll correction when the image is to be output to only the display unit is less than a degree of correction of the roll correction when the image is to be output to the display unit and an output destination other than the display unit.

18 Claims, 7 Drawing Sheets

(51) Int. Cl.
*H04N 23/68* (2023.01)
*H04N 23/61* (2023.01)

(58) Field of Classification Search
USPC .................................................... 348/222.1
See application file for complete search history.

(56) References Cited

U.S. PATENT DOCUMENTS

| | | | | |
|---|---|---|---|---|
| 8,243,152 | B2* | 8/2012 | Uenaka | H04N 23/6812 |
| | | | | 348/208.99 |
| 8,964,043 | B2* | 2/2015 | Matsuyama | H04N 5/23248 |
| | | | | 348/208.4 |
| 9,912,868 | B2* | 3/2018 | Wakamatsu | H04N 5/23216 |
| 10,218,908 | B2* | 2/2019 | Uemura | H04N 5/23267 |
| 10,893,216 | B2* | 1/2021 | Oyama | H04N 5/2224 |
| 10,956,733 | B2* | 3/2021 | Tsukamoto | H04N 23/61 |
| 11,082,619 | B2* | 8/2021 | Yukitake | H04N 23/687 |
| 11,323,621 | B2* | 5/2022 | Aikawa | H04N 5/23299 |
| 2002/0028071 | A1* | 3/2002 | Molgaard | H04N 1/4092 |
| | | | | 396/53 |
| 2007/0110170 | A1 | 5/2007 | Hoshino | |
| 2011/0149096 | A1 | 6/2011 | Matsuyama | |
| 2013/0342753 | A1* | 12/2013 | Kitagawa | H04N 23/80 |
| | | | | 348/349 |
| 2016/0371812 | A1* | 12/2016 | Tsukamoto | G06V 40/172 |
| 2017/0078577 | A1 | 3/2017 | Wakamatsu | |
| 2017/0208250 | A1 | 7/2017 | Uemura | |
| 2018/0063443 | A1* | 3/2018 | Ikeda | H04N 23/6812 |
| 2018/0184004 | A1* | 6/2018 | Murakami | G01C 25/005 |
| 2018/0316865 | A1* | 11/2018 | Wakamatsu | H04N 23/60 |
| 2019/0208141 | A1* | 7/2019 | Oyama | H04N 23/698 |
| 2020/0296284 | A1 | 9/2020 | Aikawa et al. | |
| 2021/0075967 | A1* | 3/2021 | Yukitake | H04N 23/687 |
| 2021/0176409 | A1* | 6/2021 | Tanaka | H04N 23/698 |

* cited by examiner

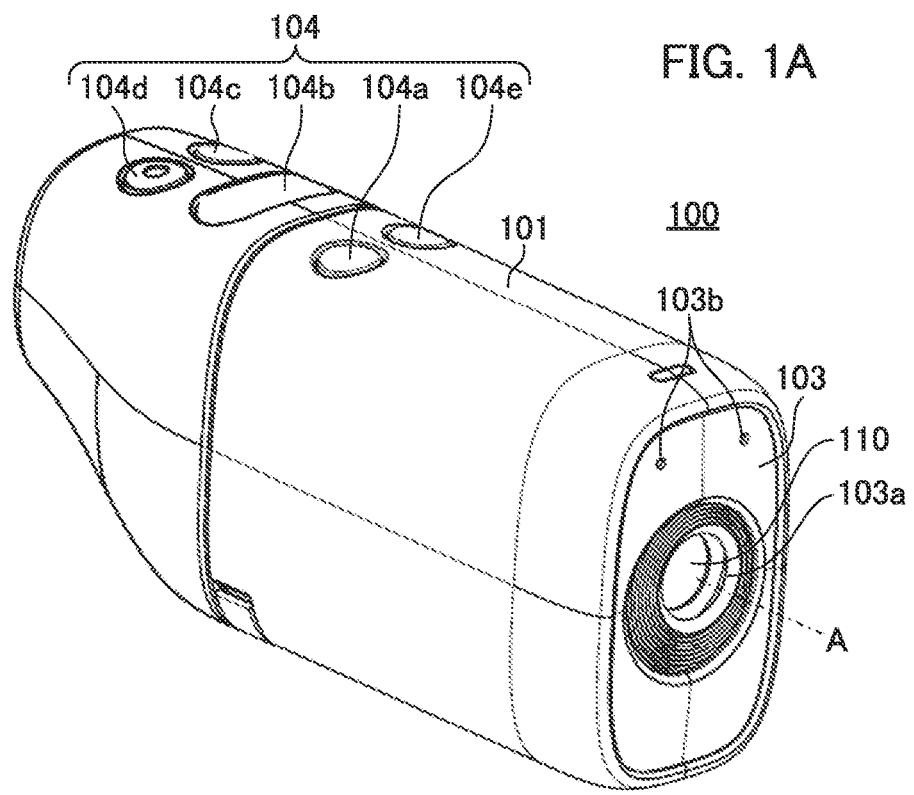
FIG. 1A
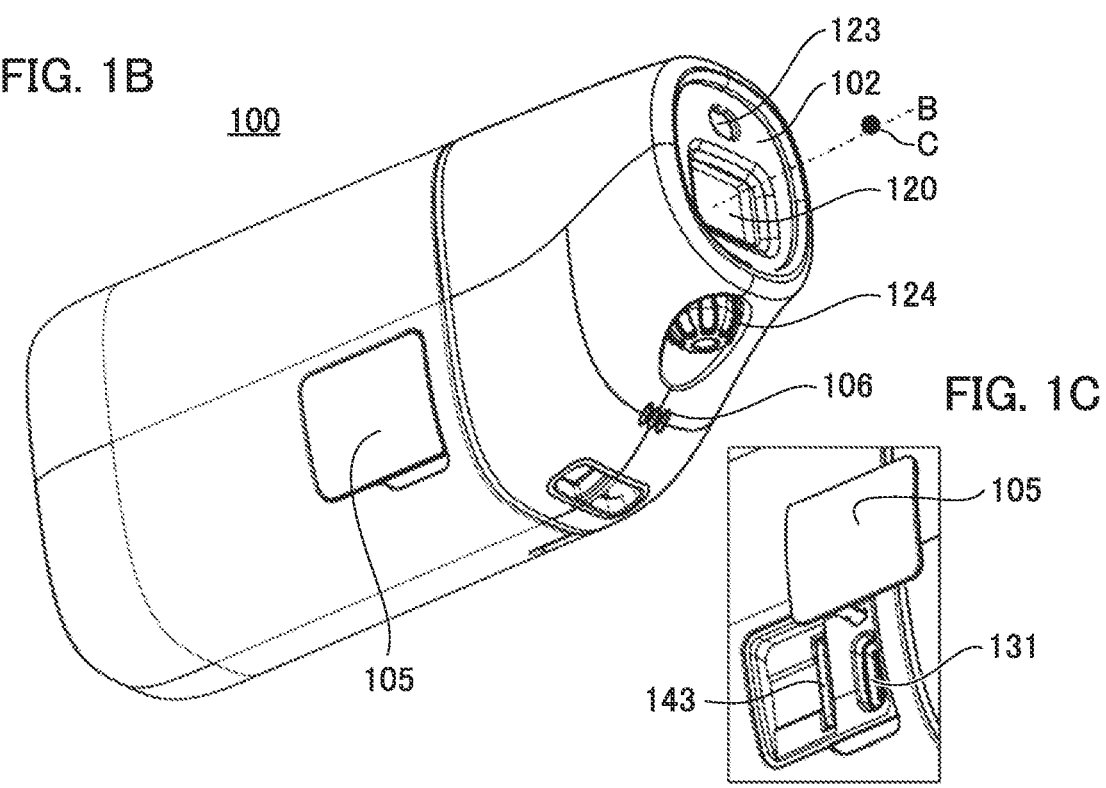
FIG. 1B
FIG. 1C

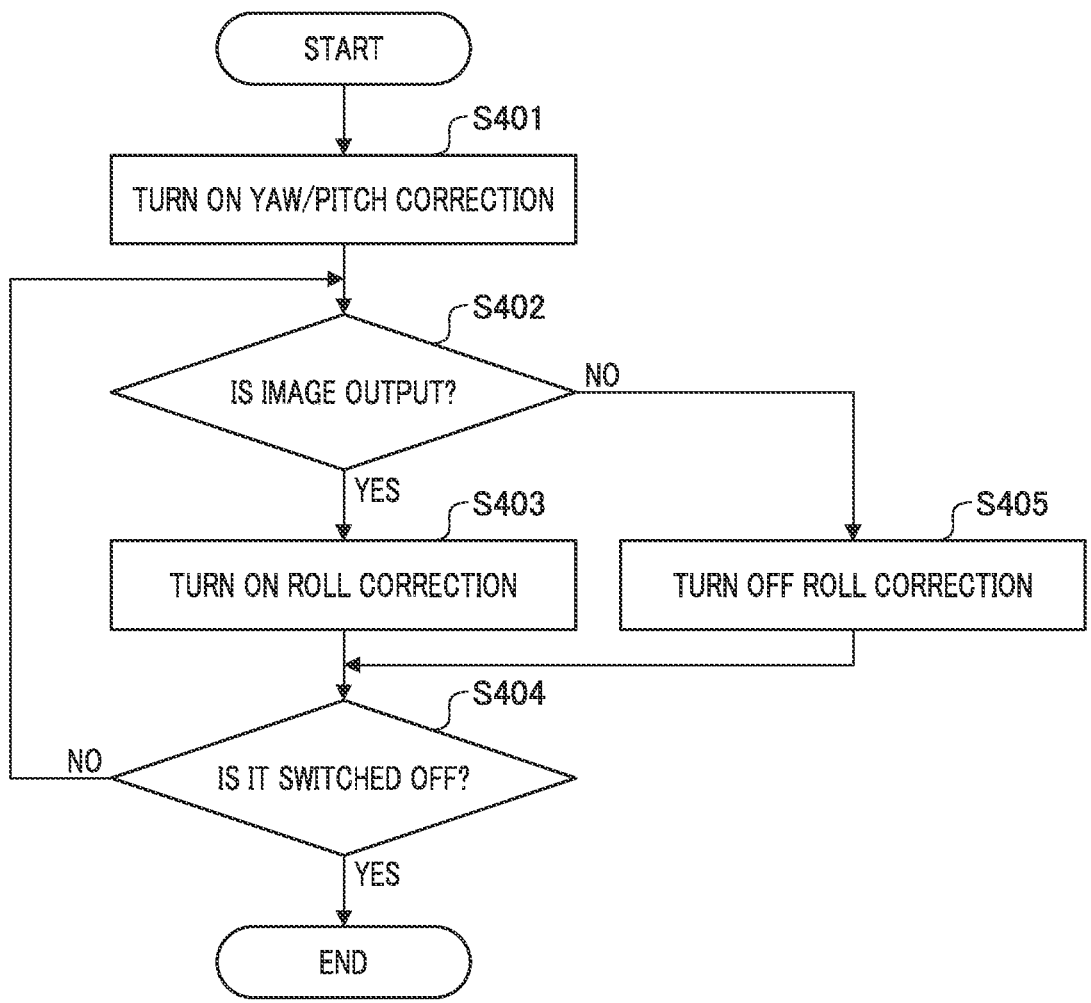

IMAGING DEVICE, CONTROL METHOD FOR IMAGING DEVICE, AND RECORDING MEDIUM

BACKGROUND OF THE INVENTION

Field of the Invention

The present invention relates to an imaging device, a control method for an imaging device, and a recording medium.

Description of the Related Art

There is a technique of displaying an image captured by a camera on a display other than a display device included in the camera in order to allow a main observer other than an image capturing person to see the image. For example, an image capturing person may wear a camera on the head thereof and an image captured by the camera may be displayed on a display which is seen by another observer. At this time, when the image capturing person inclines the head on which the camera is worn, a subject displayed on the display which is seen by the observer is also inclined. Accordingly, there is demand that a direction of an image of the subject displayed on the display not be changed as much as possible even when the image capturing person inclines the head such that the subject is appropriately displayed on the display. Japanese Patent Laid-open No. 2012-160898 discloses an image processing device that performs image inclination correction on an image displayed on a monitor unit which is seen by a person other than an observer when an image captured by a camera worn on the observer's head is displayed on the monitor unit. In the technique disclosed in Japanese Patent Laid-open No. 2012-160898, the observer wearing the camera on the head thereof visually observes an object in a real outside world as a see-through image.

However, in Japanese Patent Laid-open No. 2012-160898, the observer wearing the camera visually observes a subject, and a case in which an image capturing person observes a captured image using a display or an electronic viewfinder as in an electronic monocular telescope or an electronic binocular telescope is not considered. Accordingly, in an imaging device that can output a captured image to both a display unit of a camera which is seen by a main observer and a display other than the display unit of the camera and which is seen by another observer, an appropriate image which causes less discomfort to an image capturing person needs to be displayed.

SUMMARY OF THE INVENTION

The present invention provides an imaging device that can output an image to a display unit of the imaging device and an output destination other than the display unit such that an appropriate image is displayed on the output destination.

According to the present invention, there is provided an imaging device in which an imaging sensor that captures an image and a display unit that displays the image are provided, the imaging device comprising: a processor; and a memory storing a program which, when executed by the processor, causes the processor to execute: performing roll correction on the image; controlling an output of the image; and displaying the output image on the display unit, wherein the performing of roll correction on the image includes performing the roll correction such that a degree of correction of the roll correction when the image is to be output to only the display unit is less than a degree of correction of the roll correction when the image is to be output to the display unit and an output destination other than the display unit.

Further features of the present invention will become apparent from the following description of embodiments with reference to the attached drawings.

BRIEF DESCRIPTION OF THE DRAWINGS

FIGS. 1A to 1C are perspective views illustrating an appearance of an imaging device.

FIG. 4 is a flowchart illustrating a roll correction switching process.

DESCRIPTION OF THE EMBODIMENTS

First Embodiment

Figure 2:
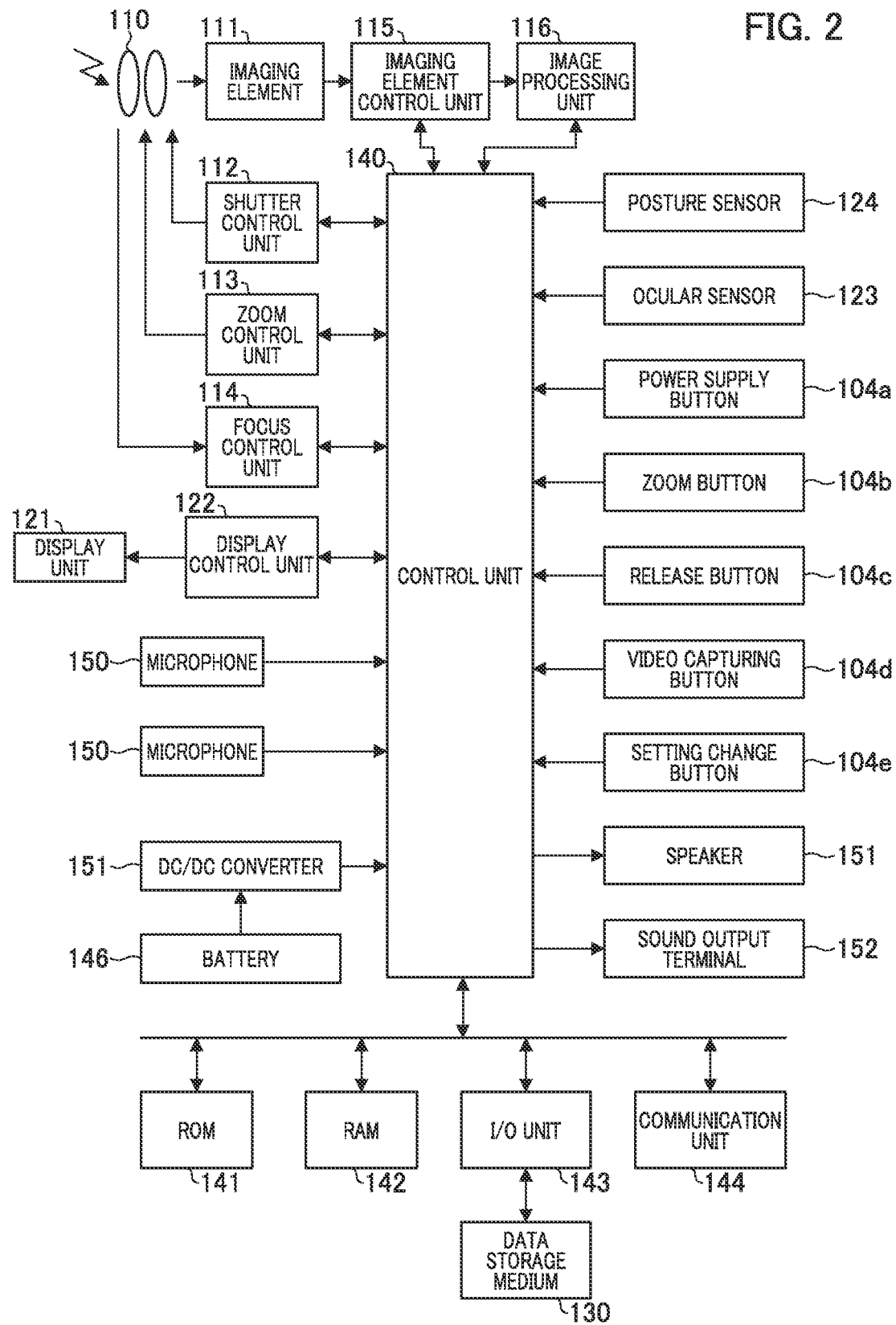
FIG. 2 is a diagram illustrating a configuration of the imaging device.

A configuration of an imaging device 100 which is an example of an electronic device to which the present invention can be applied will be described with reference to FIGS. 1A to 2. FIGS. 1A to 1C are perspective views illustrating an appearance of the imaging device 100. FIG. 1A is a perspective view illustrating an appearance of the imaging device 100 when seen from a front side (a subject side). FIG. 1B is a perspective view illustrating an appearance of the imaging device 100 when seen from a rear side opposite to the subject side. FIG. 1C is a diagram illustrating a state in which a terminal lid 105 of the imaging device 100 is open. FIG. 2 is a diagram illustrating the configuration of the imaging device 100.

The imaging device 100 is an example of an electronic device integrally including an imaging element such as an electronic monocular telescope, an electronic binocular telescope, or a digital camera and a display means. The imaging device 100 includes a lateral cover 101, a rear panel 102, and a front panel 103 which serve as a body housing. An opening 103a is formed in the front panel 103, and a subject image is input to an imaging optical system 110 via the opening 103a. The subject image is formed on an imaging element 111 which is an imaging means via the imaging optical system 110. An imaging-lens optical axis A of the imaging optical system 110 extends in an extending direction of the imaging device 100. In this embodiment, an example in which a body of the imaging device and a lens unit are unified will be described, but the present invention is not limited thereto and the lens unit may be detached from the body.

Two microphone holes 103b facing a subject side are provided in the front panel 103. A corresponding microphone 150 is provided in each of the two microphone holes 103b. The microphone holes 103b guide sound from the outside to the microphones 150. The imaging device 100 can collect sound in monaural and also collect sound in stereo using the two microphones 150.

A terminal lid 105 that is coupled to the imaging device 100 such that is can be opened and closed is provided on a lateral surface of the lateral cover 101. FIG. 1B illustrates a state in which the terminal lid 105 is closed, and FIG. 1C illustrates a state in which the terminal lid 105 is open. An I/O unit 143 and a connection terminal 131 are provided in the terminal lid 105 of the lateral cover 101. The I/O unit 143 is an input/output connector unit configured to transmit and receive information by allowing a detachable data storage medium 130 such as an SD card to be mounted thereon. The connection terminal 131 is a connection terminal 131 such as a USB connection terminal that is used to transmit and receive information or electric power.

Five operation buttons 104 are provided on the top surface of the lateral cover 101. The five operation buttons 104 include a power supply button 104a, a zoom button 104b, a release button 104c, a video capturing button 104d, and a setting change button 104e. The power supply button 104a is an operation button that is used to turn on/off a power supply of the imaging device 100. The zoom button 104b is an operation button that is used to perform a zoom operation for changing an imaging power of the imaging device 100. The release button 104c is an operation button that is used to focus on a subject by moving a focusing group such as a zoom lens in the imaging optical system 110 or to perform release of capturing a still image. The video capturing button 104d is an operation button that is used to start and end capturing a moving image. The setting change button 104e is an operation button that is used to change various settings of the imaging device 100, and a menu associated with settings is displayed when the setting change button 104e is pushed. Selective change of various settings is performed using the zoom button 104b, the release button 104c, the video capturing button 104d, and the setting change button 104e. The forms, functions, and arrangement of the operation buttons mentioned herein are only an example, and the operation buttons may be functionally combined with other operation buttons or may have another arrangement.

A visibility adjustment dial 124 and sound holes 106 are provided in the bottom of the lateral cover. The visibility adjustment dial 124 is a dial that is used to adjust a focus of a visibility adjustment means. The sound holes 106 emit sound from a speaker 151.

An ocular window 120 and an ocular sensor 123 are provided in the rear panel 102. A display means is disposed in the ocular window 120. The display means is an electronic viewfinder (EVF) including a display unit 121 and an ocular lens group and a visibility adjustment means which are not illustrated. The display unit 121 is a display formed of an organic EL display, a liquid crystal display, or the like. The ocular lens group enlarges display on the display unit 121 such that an image capturing person can easily see the display unit 121. The image capturing person can see the display at a position at which the display is best visible by setting a sight line on an ocular-lens optical axis B of the ocular lens group and setting an eye position to an eye point C of the ocular lens group on the ocular-lens optical axis B. The imaging-lens optical axis A and the ocular-lens optical axis B in the imaging device 100 are parallel to each other. The visibility adjustment means can adjust a focal position according to the eyesight of the image capturing person. The ocular sensor 123 is provided above the ocular window 120 and detects that the image capturing person is looking into the ocular window 120. In this embodiment, an example in which the display means is an electronic viewfinder is described, but the present invention is not limited thereto and the display means may be a display or the like.

An electrical configuration of the imaging device 100 will be described below. The imaging device 100 includes a control unit 140, a read only memory (ROM) 141, a random access memory (RAM) 142, and an I/O unit 143, and a detachable data storage medium 130 is attached thereto. The control unit 140 is a central processing unit (CPU) and controls the imaging device 100 as a whole. The ROM 141 is connected to the control unit 140, and the control unit 140 performs various types of control of the imaging device 100 based on a control program stored in the ROM 141.

The ROM 141 is a nonvolatile memory in which a control program is stored. The RAM 142 is a volatile memory. The RAM 142 is a temporary storage area such as a main memory or a work area in which the control unit 140 operates. For example, the RAM 142 includes an image loading area, a work area, a video RAM (VRAM), and a temporary saving area. The image loading area is used as a temporary buffer that temporarily stores captured image data sent from an image processing unit 116, compression-converted image data read from the data storage medium 130, or the like. The image loading area is also used as an image-dedicated work area for an image compressing process and an image decompressing process. The work area is an area in which various programs are executed. The VRAM is an area in which display data displayed on the display unit 121 is stored. The temporary saving area is an area in which various types of data are temporarily saved.

The data storage medium 130 is a detachable storage medium such as an SD card or an HDD. In the data storage medium 130, captured image data or moving image data which has been compressed and converted is stored in the form of a file. The I/O unit 143 controls transmission and reception of data to and from the data storage medium 130 based on an instruction from the control unit 140.

The imaging device 100 includes an imaging optical system 110, an imaging element 111, a shutter control unit 112, a zoom control unit 113, a focus control unit 114, an imaging element control unit 115, and an image processing unit 116. The imaging optical system 110 includes a plurality of lenses such as a zoom lens and a focusing lens, an aperture, and a shutter. The aperture is a light intensity adjustment means configured to control an amount of light flux passing through the imaging optical system 110. The imaging optical system 110 forms an optical image of a subject on the imaging element 111. The imaging element 111 is a photoelectric conversion element such as a CMOS or a CCD and is an imaging unit that outputs an output signal (an analog signal) corresponding to the optical image. When the imaging element 111 is a CMOS element, pixel data thinned in a horizontal direction and a vertical direction can be output in accordance with a resolution changing instruction from the imaging element control unit 115.

The imaging element control unit 115 includes a timing generator, a signal processing circuit, and an A/D conversion circuit and controls the imaging element 111 and an output signal from the imaging element 111. The timing generator supplies a transfer clock signal or a shutter signal to the imaging element 111. The signal processing circuit performs a noise removing process or a gain setting process on an output signal output from the imaging element 111. The A/D conversion circuit converts an analog signal to a digital signal. Specifications of digital signal conversion in the A/D conversion circuit can be changed in various forms based on specifications of the imaging element or the like.

The image processing unit 116 performs various types of image processing such as gamma conversion, color space conversion, white balance adjustment, and exposure adjustment on a digital signal output from the imaging element control unit 115. The image processing unit 116 performs image processing of correcting shake or rotation of an image such as pitch correction, yaw correction, and roll correction based on posture information of the imaging device 100 acquired by a posture sensor 125. Image shake correction such as pitch correction, yaw correction, and roll correction is electronically performed through image cutting in the image processing unit 116 or the like. Pitch correction, yaw correction, and roll correction which are performed by the image processing unit 116 may be performed based on motion information of a subject acquired from captured image data. Pitch correction, yaw correction, and roll correction may be performed by controlling an imaging surface of the imaging element 111 or shifting a shift lens of the imaging optical system 110. Pitch correction, yaw correction, and roll correction performed by the image processing unit 116 are controlled by the control unit 140, which also determines whether a correction process is to be performed.

The shutter control unit 112 drives the shutter of the imaging optical system 110 based on an instruction from the control unit 140. The zoom control unit 113 drives the zoom lens of the imaging optical system 110 based on an instruction from the control unit 140. The focus control unit 114 drives the focusing lens of the imaging optical system 110 based on an instruction from the control unit 140. The control unit 140 calculates whether it is in focus (or whether the current position of the imaging optical system 110 is in focus) by what extent the focusing lens is driven from the current position, and instructs an amount of drive of the focusing lens to the focus control unit 114. The focus control unit 114 performs a focusing operation by moving the focusing lens based on the amount of drive instructed by the control unit 140. Although a lens driving method for a focusing operation has been described above, the same effect is also achieved by changing a relative position between the imaging element 111 and the imaging optical system 110, and thus a method of driving the imaging element 111 along the imaging-lens optical axis A may be employed.

The imaging device 100 includes a DC/DC converter 145 and a battery 146. The DC/DC converter 145 generates a voltage from electric power supplied from the battery 146 and supplies the voltage to the constituents such as the control unit 140. The DC/DC converter 145 controls start and stop of supply of the voltage based on a control signal from the control unit 140. The battery 146 is a primary battery or a rechargeable secondary battery and supplies electric power to the DC/DC converter 145. The electric power does not need to be supplied from the battery as long as electric power is supplied to the DC/DC converter 145. The DC/DC converter 145 may be supplied with electric power, for example, from an external power supply such as a mobile battery connected to the connection terminal 131.

The imaging device 100 includes the power supply button 104a, the zoom button 104b, the release button 104c, the video capturing button 104d, and the setting change button 104e. These buttons are connected to the control unit 140. The control unit 140 is started by turning on the power supply button 104a and is stopped by turning off the power supply button 104a. The control unit 140 controls the DC/DC converter 145 in response to an operation of the power supply button 104a.

When the zoom button 104b is operated, a zoom position of the imaging optical system 110 can be changed. The control unit 140 drives the zoom lens of the imaging optical system 110 to change the zoom position of the imaging optical system 110 by controlling the zoom control unit 113 in response to the operation of the zoom button 104b. The release button 104c has switch positions of two steps according to a pushed position. When the position of the first step is detected (SW1 ON), an operation of locking camera settings such as white balance, light measurement, and focusing is performed. When the position of the second step is detected (SW2 ON), image capturing is performed and a subject image signal is acquired. The control unit 140 controls the focus control unit 114, the shutter control unit 112, and the like according to the control of the release button 104c. When the video capturing button 104d is operated, acquiring of a subject moving image signal and recording of sound can be started/ended. Taking of a subject moving image signal and recording of sound are started with first push of the video capturing button 104d and taking of the subject moving image signal and recording of sound are ended with second push of the video capturing button 104d. The control unit 140 transmits a video capturing instruction to the imaging element control unit 115 and transmits a sound recording instruction to the microphone 150 with the operation of the video capturing button 104d.

The imaging device 100 includes a display unit 121 and a display control unit 122. The display unit 121 includes an organic EL display device or a liquid crystal display device and displays an image (including a still image and a moving image) captured by the imaging element 111 or information on the image capturing. The display unit 121 is controlled by the display control unit 122. The display control unit 122 adjusts a display size, luminance, and the like of an image in accordance with an instruction from the control unit 140 and controls display of the image on the display unit 121. The display control unit 122 controls information which is superimposed on the image.

The display control unit 122 includes an ocular sensor 123. The ocular sensor 123 is provided in the vicinity of the display unit 121. When an image capturing user looks into the display unit 121, the ocular sensor 123 detects that the image capturing user has approached to within a predetermined distance or less therefrom and turns on the display unit 121. On the other hand, when the ocular sensor 123 detects that the image capturing person is separated by a predetermined distance or more from the ocular sensor 123, the ocular sensor 123 turns off the display unit 121. Through this operation, it is possible to decrease power consumption of the imaging device and to curb emission of heat.

The imaging device 100 includes a microphone 150 such that external sound is collected. The imaging device 100 according to this embodiment includes two microphones 150 and can perform sound collection in monaural and sound collection in stereo. The control unit 140 synchronizes moving image data with sound data acquired by the microphone 150 and stores the two pieces of data as a single piece of video data in the data storage medium 130.

The imaging device 100 includes a speaker 151 and a sound output terminal 152. The speaker 151 is an electro-acoustic transducer that can output sound such as electronic sound or sound included in video data. The sound output terminal 152 is a sound output terminal such as an earphone jack to which a headphone or the like can be connected. The sound output terminal 152 can output stereo sound in addition to monaural sound to the headphone connected thereto. The sound output terminal 152 may be, for example, a connection terminal 131 such as a USB connection terminal.

When video data is reproduced in the imaging device 100, video data stored in the e data storage medium 130 is selected. When reproduction of the video image data is performed, moving image data included in the video data is displayed on the display unit 121 by the display control unit 122. At the same time, sound data included in the video data is reproduced and output from the speaker 151 or the sound output terminal 152 in synchronization with the moving image data by the control unit 140.

The imaging device 100 includes a communication unit 144 that transmits and receives data or electric power by being connected to an external device such as another imaging device, a smartphone, or a display device. The communication unit 144 may be a connection terminal 131 such as a USB connection terminal or may be a radio connection means such as Wi-Fi or BlueTooth. When a wired connection terminal 131 is used, transmission and reception of electric power in addition to transmission and reception of data is possible. On the other hand, when a radio connection means is used, transmission and reception of data is possible by being connected to an external device. The control unit 140 communicates with an external device connected thereto via the communication unit 144 and performs control for outputting video data to the external device. Only when the external device is a display device or an electronic device including a display unit such as an imaging device or a smartphone, the control unit 140 may perform control for outputting video data to the external device.

The control unit 140 controls the imaging device 100 as a whole. The control unit 140 performs various types of image processing including roll correction in the image processing unit 116. The control unit 140 reads captured image data output from the image processing unit 116, transmits the captured image data to the RAM 142, and outputs the captured image data to output destinations. The output destinations of the captured image data include the display unit 121, the data storage medium 130, and the external device. The control unit 140 transmits the captured image data from the RAM 142 to the display unit 121 via the display control unit 122. The control unit 140 stores the captured image data in the data storage medium 130 via the I/O unit 143. The control unit 140 outputs the captured image data to the external device via the communication unit 144. When the captured image data is moving image data, sound data in addition to the moving image data is output. The control unit 140 also controls a sound collection method in the microphone 150 when the moving image data is recorded.

Roll correction will be described below. FIGS. 3A to 3D are diagrams illustrating roll correction. In the following description, a person who is imaging a subject 301 using the imaging device 100 is referred to as a main observer, and a person who is viewing a video captured by the imaging device 100 using a display device other than the imaging device 100 is referred to as a viewer.

Figure 3A:
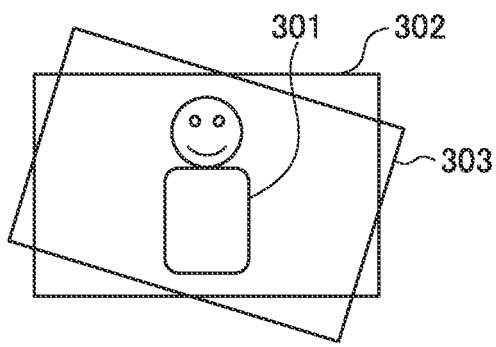
FIGS. 3A to 3D are diagrams illustrating roll correction.

FIG. 3A is a diagram illustrating a display example of a screen when a main observer is observing a subject 301 using the imaging device 100. That is, FIG. 3A illustrates an example of a screen which is displayed on the display unit 121 of the imaging device 100 without performing roll correction thereon. The subject 301 stands up on a horizontal ground. A screen 302 is a display example of a screen when the main observer keeps the imaging device 100 horizontal. A screen 303 is a display example of a screen when the main observer keeps the imaging device 100 inclined. When the imaging device 100 is inclined, the screen is inclined but the inclination of the subject 301 is the same as the actual inclination of the subject 301. Accordingly, the inclination of the subject 301 which is observed by the main observer using the imaging device 100 is the same as the actual inclination of the subject 301 regardless of whether the imaging device 100 is kept inclined. In this case, the main observer does not feel discomfort without performing a roll correction process on an image displayed on the display unit 121 according to the inclination of the imaging device 100. That is, when the main observer is observing a subject the imaging device 100, roll correction is not necessary.

Figure 3B:
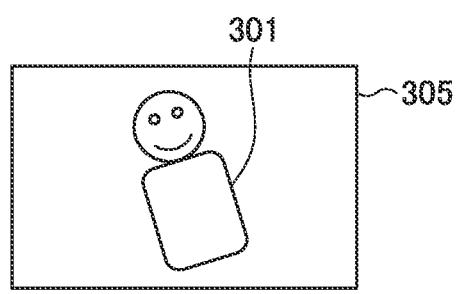

FIG. 3B is a diagram illustrating a display example of a screen when an image captured by the imaging device 100 is displayed on a display device other than the imaging device 100 without performing roll correction thereon. A screen frame 305 is a screen frame of the display device which is kept horizontal. An image displayed in the screen frame 305 in FIG. 3B is an image when the imaging device 100 is kept inclined (the screen 303 in FIG. 3A). On the screen of the horizontal display device, the subject 301 is inclined in the opposite direction by the inclination of the screen 303 of the imaging device 100. Accordingly, the inclination of the subject 301 displayed on the screen frame 305 with respect to the horizontal direction is different from the actual inclination of the subject 301 and a viewer feels discomfort.

Figure 3C:
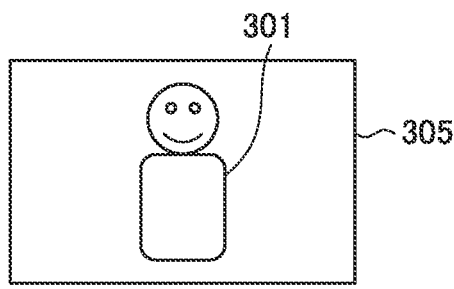

FIG. 3C is a diagram illustrating a display example of a screen when an image with a roll correction process performed thereon is displayed on a display device other than the imaging device 100. The image displayed in the screen frame 305 in FIG. 3B is an image with roll correction performed thereon when the imaging device 100 is kept inclined (the screen 303 in FIG. 3A) according to the inclination of the imaging device 100. By performing roll correction according to the inclination of the imaging device 100, the inclination of the subject 301 displayed on the display device is the same as the actual inclination of the subject 301 and a viewer can see the image without feeling discomfort.

Figure 3D:
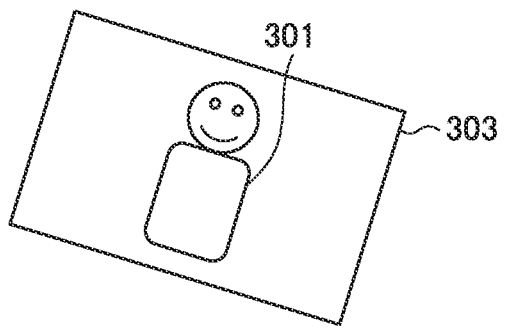

FIG. 3D is a diagram illustrating a display example of a screen when an image with a roll correction process performed thereon is displayed on the display unit 121 of the imaging device 100. That is, FIG. 3D is a diagram illustrating an example in which the image with roll correction performed thereon illustrated in FIG. 3C is displayed on the display unit 121 of the imaging device 100 which is kept inclined. The inclination of the subject 301 displayed on the screen 303 of the imaging device 100 which is kept inclined is different from the actual inclination of the subject 301, and thus a viewer feels discomfort.

When the imaging device 100 is kept horizontal, a main observer seeing a screen displayed on the imaging device 100 and a viewer viewing a screen displayed on an external display device does not feel discomfort. However, when a user carries the imaging device 100, it is difficult to always keep the imaging device 100 horizontal. The user cannot capture an image at a free angle such as an angle at which the user leans to one side. When a main observer outputs a captured image to another display device while capturing an image at free angles using the imaging device 100, the captured image can be appropriately displayed by performing roll correction thereon. However, when roll correction is performed, the roll correction is performed on the image which is displayed on the imaging device 100 and which is observed by the main observer and thus the main observer feels discomfort. Accordingly, instead of always performing roll correction, it is preferable that the roll correction not be performed when only the main observer observes the image. Therefore, in this embodiment, roll correction is not performed when only the main observer observes an image captured in real time by the imaging device 100, and roll correction is performed when a video is output to a display device other than the imaging device 100 or is recorded to view the video later or the like.

A roll correction switching process according to this embodiment will be described below. As described above, in this embodiment, when only an image capturing person observes an image displayed on the display unit 121 of the imaging device 100 in real time, that is, when an output destination of the captured image is only the display unit 121, roll correction is not performed. On the other hand, when a viewer views an image displayed on an external device or ascertains a recorded image later, that is, when an output destination of a captured image includes an output destination other than the display unit 121 such as a display device other than the imaging device 100 or a recording medium of the imaging device 100, roll correction is performed. Accordingly, in this embodiment, a process of turning on/off roll correction depending on whether an image is to be output to an output destination other than the display unit 121 of the imaging device 100 is performed.

FIG. 4 is a flowchart illustrating the roll correction switching process. The method illustrated in FIG. 4 is realized by causing the control unit 140 to execute a program stored in a computer-readable storage medium such as the ROM 141. This method is started, for example, when the imaging device 100 is powered on with the power supply button 104a being pushed. First, in Step S401, the control unit 140 turns on yaw correction and pitch correction in the image processing unit 116. Thereafter, the method proceeds to Step S402.

In Step S402, the control unit 140 determines whether an image is to be output to an output destination other than the display unit 121 of the imaging device 100. The control unit 140 determines whether an image is to be output to an output destination other than the display unit 121 of the imaging device 100 depending on whether the image is to be output to an external device or a storage medium. Specifically, the control unit 140 communicates with an external device connected thereto via the communication unit 144 and determines whether the external device is an electronic device including a display unit. When the external device is an electronic device including a display unit, it is determined that an image is to be output to an output destination other than the display unit 121 of the imaging device 100. The control unit 140 also determines whether video data is to be stored in the data storage medium 130. When the video data is to be stored in the data storage medium 130, it is also determined that the image is to be output to an output destination other than the display unit 121 of the imaging device 100. When a predetermined mode such as a video capturing mode in which a video is captured is selected with switching of a mode or with pushing of the video capturing button 104d, the control unit 140 also determines that the video is scheduled to be output to an output destination other than the display unit 121 of the imaging device 100 and determines that the video is to be output to the output destination other than the display unit 121 of the imaging device 100. When the video is to be output to an output destination other than the display unit 121 of the imaging device 100, the method proceeds to Step S403. On the other hand, when the video is not to be output to an output destination other than the display unit 121 of the imaging device 100, the method proceeds to Step S405.

When the video is to be output to an output destination other than the display unit 121 of the imaging device 100, the control unit 140 turns on roll correction in Step S403. When the roll correction is turned on, the image processing unit 116 performs a roll correction process on the captured video. Accordingly, roll correction is performed on the video which is to be output to an output destination other than the display unit 121. Thereafter, the method proceeds to Step S404. On the other hand, when the video is not to be output to an output destination other than the display unit 121 of the imaging device 100, the control unit 140 turns off roll correction in Step S405. Accordingly, roll correction is not performed on a video which is to be output to only the display unit 121. Thereafter, the method proceeds to Step S404.

In Step S404, the control unit 140 detects an ON/OFF state of the power supply button 104a. When it is determined that the power supply button 104a is in the OFF state, the method ends. On the other hand, when it is detected that the power supply button 104a is in the ON state, the method returns to Step S402 and it is determined whether a video is to be output to an output destination other than the display unit 121 in order to determine whether roll correction is switched.

As described above, according to this embodiment, roll correction is performed when an image is to be output to an output destination other than the display unit of the imaging device, and roll correction is not performed when an image is to be output to only the display unit of the imaging device. Accordingly, a viewer who views an image captured by the imaging device using an external device or the like can view an image with less discomfort regardless of the inclination of the imaging device. When only an image capturing person views an image, an image in which an actual inclination of a subject is the same as an inclination of the subject in the image displayed on the display unit 121 and from which the image capturing person feels less discomfort can be displayed on the display unit 121 by not performing roll correction. Accordingly, when an image is not to be output to an output destination other than the display unit of the imaging device and the imaging device 100 is used as a monocular telescope or a binocular telescope, it is possible to observe the image with a free posture and angle. In this embodiment, an example in which roll correction is not performed when an image is to be output to only the display unit of the imaging device has been described above, the same advantages can be achieved as long as discomfort of an image capturing person can be reduced and thus the roll correction is necessarily turned off. That is, control can be performed such that a degree of correction of roll shake is less in Step S405 than in Step S403. The degree of correction of roll shake indicates a correction value of generated roll shake and is defined such that the degree of correction of the roll correction is less with a less roll shake correction value, that is, with a larger residual roll shake, when the roll shake has been generated. For example, when an image capturing person looks into the ocular window 120, the head of the image capturing person is fixed but the hand holding the imaging device shakes a little and thus there is a likelihood that the little roll shake will cause the image capturing person to feel discomfort. Accordingly, in Step S405, the degree of correction may be decreased by not correcting a low-frequency component in the roll shake to be corrected but correcting only a high-frequency component in Step S403. By applying a less gain in Step S403, the degree of correction may be decreased and a shake component in a frequency band narrower than that in Step S403 may be corrected.

Second Embodiment

In the first embodiment, an example in which roll correction is performed on a video which is to be output to the display unit 121 when the video is to be output to an output destination other than the display unit 121 has been described above. In this case, an inclination of a subject in an image with roll correction performed thereon and displayed on the display unit 121 is different from the actual inclination of the subject and thus an image capturing person (a main observer) viewing both images feels discomfort. Therefore, in a second embodiment, an example in which roll correction is performed on only an image which is to be output to an output destination other than the display unit of the imaging device will be described.

When roll correction is performed on only an image which is to be output to an output destination other than the display unit of the imaging device, both an image capturing person using the imaging device 100 and a viewer who observes an output image can observe a subject with an inclination not causing discomfort. On the other hand, when the inclination of the imaging device 100 is particularly large and roll correction of an output image is performed by imaging trimming, extremely trimming the output image is considered. In order not to extremely trim the output image through roll correction, it is necessary to curb the inclination of the imaging device 100. Therefore, in this embodiment, by displaying an indication indicating an inclination of the imaging device on the display unit 121, the image capturing person which is capturing an image while viewing the display unit 121 is notified of the inclination of the imaging device 100 and the inclination of the imaging device 100 is curbed.

Figure 5:
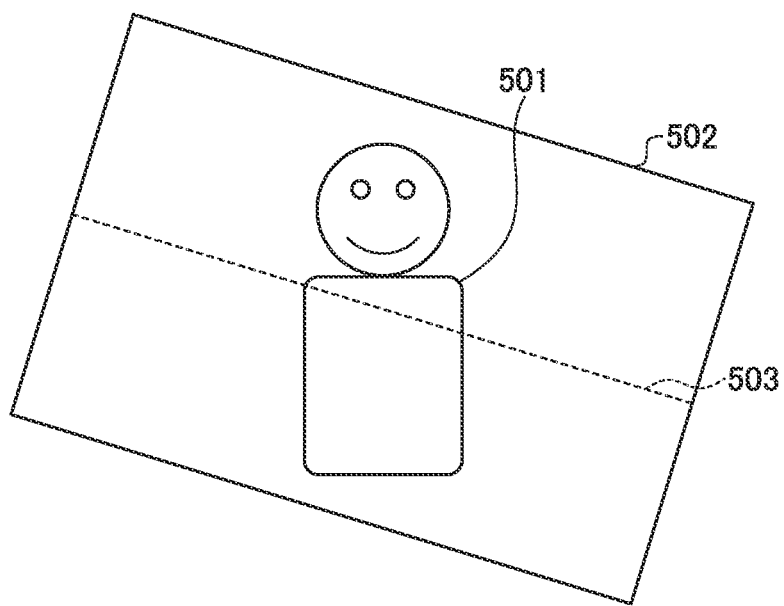
FIG. 5 is a diagram illustrating an example of an indication indicating horizontality.

FIG. 5 is a diagram illustrating an example of an indication indicating horizontality which is displayed on the display unit 121. FIG. 5 illustrates an example of an image which is displayed on the display unit 121 of the imaging device 100 and which is acquired by imaging a subject 501 in a state in which the imaging device 100 is held inclined according to this embodiment. In this embodiment, since roll correction is not performed on an image which is to be displayed on the display unit 121, roll correction has not been performed on the image illustrated in FIG. 5. Accordingly, a screen frame 502 of the display unit 121 is also inclined according to the inclination of the imaging device 100.

In the screen frame 502, an indication 503 indicating horizontality is displayed. The indication 503 indicating horizontality is a straight line which is horizontal in the screen frame 502. An image capturing person can recognize the inclination of the imaging device 100 by comparing the indication 503 indicating horizontality with the inclination of the subject 501. The indication 503 indicating horizontality is an example of an indication indicating an inclination of the imaging device. The indication indicating the inclination of the imaging device is not limited to a straight line which is horizontal in the screen frame 502 as long as it can allow an image capturing person to recognize the inclination of the imaging device 100. For example, a level may be displayed as the indication indicating the inclination of the imaging device or it may be an indication indicating the horizontal direction. The indication indicating the inclination of the imaging device may be an inclination indicating a screen frame of an image after roll correction has been performed or may be an indication indicating a roll correction direction and a correction value. The indication indicating the inclination of the imaging device may be displayed by attenuating roll correction.

When the inclination of the imaging device 100 is greater than a predetermined inclination, a warning may be issued. The warning may be, for example, displaying of a mark or outputting of a warning sound or may be a change in color of the indication 503 indicating horizontality. By displaying an indication indicating the inclination of the imaging device on an image displayed on the display unit 121, an image capturing person using the imaging device 100 can understand by what degree the imaging device 100 is inclined. By notifying the image capturing person by what degree the imaging device 100 is inclined, it is possible to curb the inclination of the imaging device 100.

Figure 6:
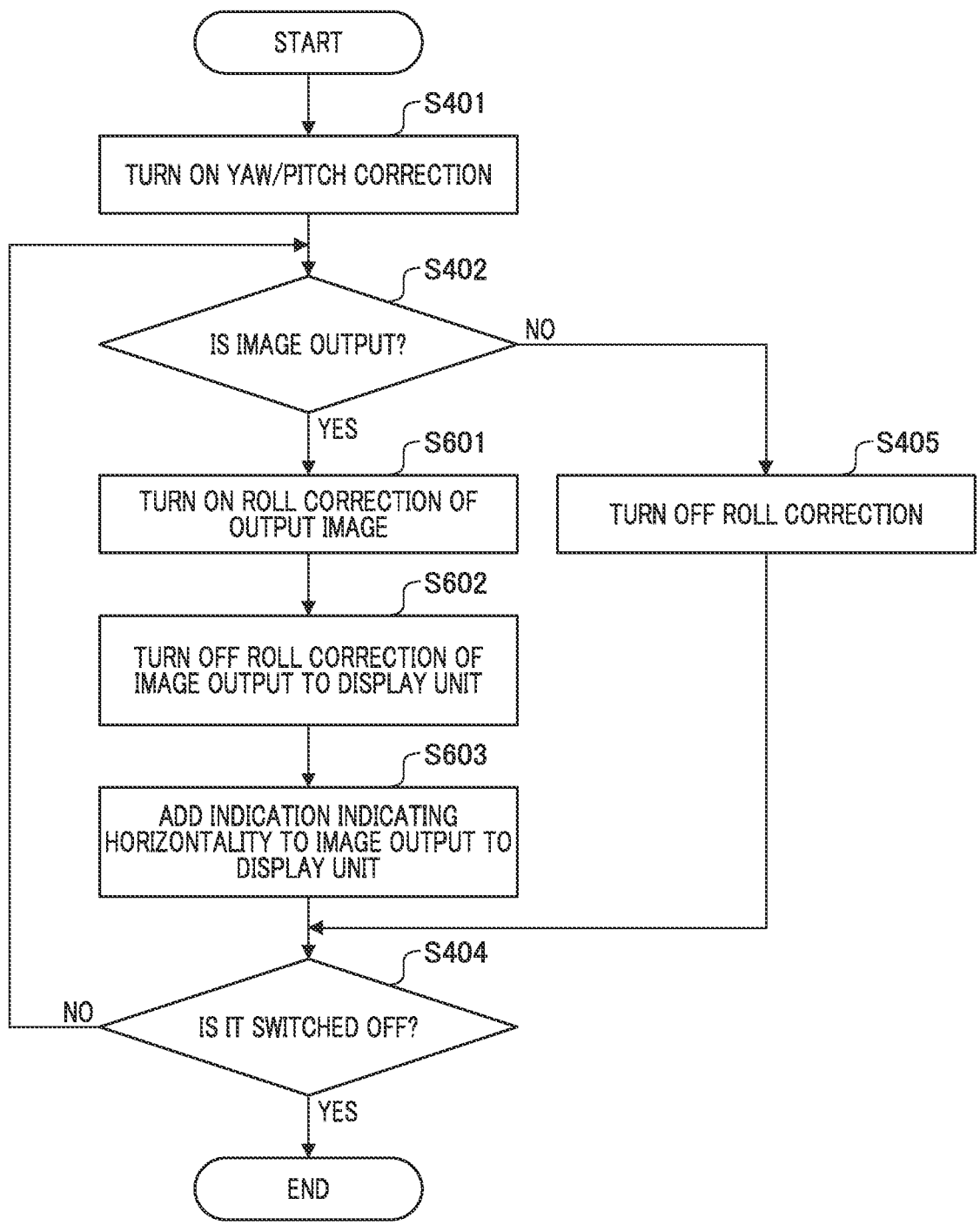
FIG. 6 is a flowchart illustrating a roll correction switching process and a process of displaying an indication indicating horizontality.

FIG. 6 is a flowchart illustrating a roll correction switching process and a process of displaying an indication indicating horizontality. The method illustrated in FIG. 6 is realized by causing the control unit 140 and the display control unit 122 to execute programs stored in the computer-readable storage medium such as the ROM 141. This method is started, for example, when the imaging device 100 is powered on with the power supply button 104a being pushed. In FIG. 6, the same steps as in the first embodiment will be referred to by the same reference signs and description thereof will be omitted. Different process steps will be described below.

When it is determined in Step S402 that an image is to be output to an output destination other than the display unit 121, the method proceeds to Step S601. In Step S601, the control unit 140 turns on roll correction on an image which is to be output to an output destination other than the display unit 121. When roll correction is turned on, the image processing unit 116 performs a roll correction process on the captured image. Thereafter, the method proceeds to Step S602. In Step S602, the control unit 140 turns off roll correction on an image which is to be output to the display unit 121. Thereafter, the method proceeds to Step S603. In Step S603, the display control unit 122 displays an indication indicating the inclination of the imaging device on the image which is to be output to the display unit 121 in an overlapping manner. For example, the display control unit 122 displays the indication 503 indicating horizontality as the indication indicating the inclination of the imaging device in an overlapping manner. Thereafter, the method proceeds to Step S404. Through the aforementioned method, when an image is to be output to an output destination other than the display unit 121, roll correction is not performed on an image which is to be output to the display unit 121, an indication for notifying an image capturing person of the inclination of the imaging device 100 is displayed in an overlapping manner, and roll correction is performed on only an image which is to be output to an output destination other than the display unit of the imaging device.

As described above, according to this embodiment, roll correction can be performed on only an image which is to be output an output destination other than the display unit of the imaging device. A main observer observes an image with an inclination other than that with which a viewer views, but can understand by what degree the imaging device 100 is inclined with reference to the indication indicating the inclination of the imaging device which is displayed along with an image on the display unit of the imaging device. Accordingly, it is possible to curb extreme inclining of the imaging device 100 and to curb extremely trimming an output image.

Third Embodiment

Switching of roll correction has been described above in the first embodiment and the second embodiment, but switching a sound collection method accompanying switching of roll correction will be described in a third embodiment. The imaging device 100 can perform sound collection at the time of capturing a moving image in monaural or stereo. As illustrated in FIGS. 1A and 2, the imaging device 100 according to this embodiment includes a pair of microphone elements (a microphone 150 and a microphone hole 103*b*) on each of the right and left sides.

When sound collection in stereo is performed using the pair of microphone elements on each of the right and left sides, the pair of microphone elements is inclined in a roll direction from a horizontal state as the imaging device 100 becomes inclined in the roll direction from the horizontal state. When roll correction is not performed, an inclination of an image and a sense of stereo sound collected in stereo match. On the other hand, when roll correction is performed, the inclination of an image and the sense of stereo sound collected in stereo after roll correction has been performed do not match, and since sound from the vertical direction may be mistaken as sound from the horizontal direction and thus an appropriate sense of stereo cannot be obtained, a viewer feels discomfort. Therefore, in this embodiment, control is performed such that sound collection in stereo is not performed but sound collection in monaural is performed when roll correction is performed.

Figure 7:
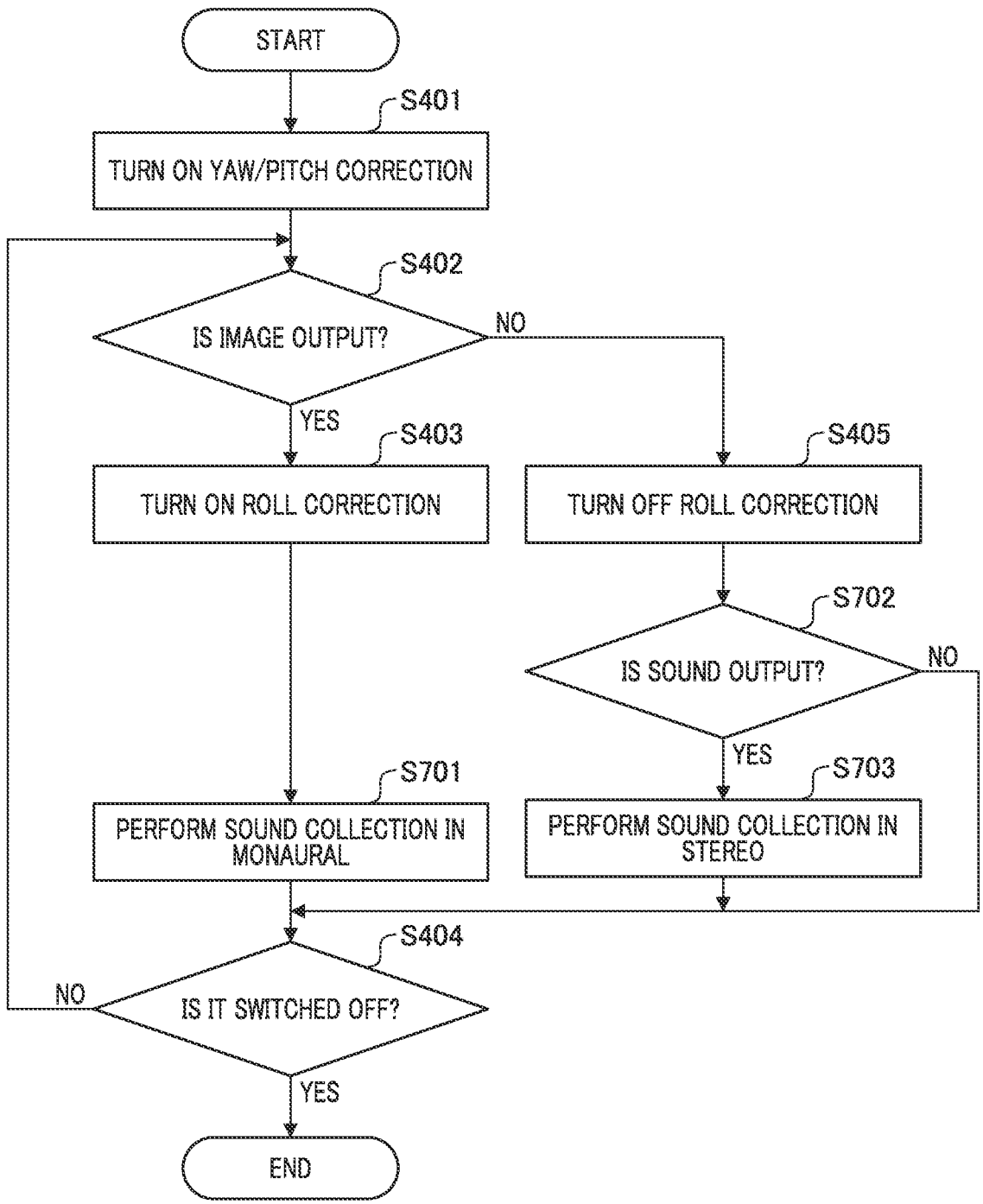
FIG. 7 is a flowchart illustrating a roll correction switching process and a sound collection method switching process.

FIG. 7 is a flowchart illustrating a roll correction switching process and a process of switching a sound collection method. The method illustrated in FIG. 7 is realized by causing the control unit 140 to execute a program stored in the computer-readable storage medium such as the ROM 141. This method is started, for example, when the imaging device 100 is powered on with the power supply button 104*a* being pushed. In FIG. 7, the same process steps as in the first embodiment will be referred to by the same reference signs and description thereof will be omitted. Different process steps will be described below.

When an image is to be output to an output destination other than the display unit 121 and roll correction is performed thereon (YES in Step S402, Step S403), the control unit 140 determines that sound collection is to be performed in monaural in Step S701. On the other hand, when an image is to be output to only the display unit 121 and thus roll correction is not performed thereon (NO in Step S402, Step S405), the control unit 140 determines whether sound is to be output in Step S702. When sound is to be output from the speaker 151 or the sound output terminal 152, it is determined that sound is to be output, and the method proceeds to Step S703. On the other hand, when it is determined that sound is not to be output, the method proceeds to Step S404. In Step S703, the control unit 140 determines that sound collection is to be performed in stereo. Thereafter, the method proceeds to Step S404.

An example in which sound collection in monaural is uniformly performed when roll correction is performed in Step S701 has been described above, the present invention is not limited thereto. Sound collection in monaural can be performed only when a large mismatch between the image and the stereo sound after roll correction has been performed occurs to such an extent that a viewer feels discomfort, and in which of monaural and stereo sound collection is to be performed may be determined, for example, according to the inclination of the imaging device 100. In this case, sound collection in stereo is performed when the inclination of the imaging device 100 is less than a predetermined inclination, and sound collection in monaural is performed when the inclination of the imaging device 100 is equal to or greater than the predetermined inclination. The determination may be performed in consideration of whether the inclination is maintained during a predetermined time or more in addition to the inclination of the imaging device 100. In this embodiment, an example in which the sound collection method is switched has been described above, but sound collection in stereo may be normally performed and sound to be output may be switched between monaural and stereo.

As described above, according to this embodiment, by switching the sound collection method to monaural when an image is to be output to an output destination other than the display unit 121, it is possible to curb a mismatch between an image and sound even when the imaging device 100 is used in an inclined state.

In the aforementioned embodiments, an example in which roll correction is performed through image processing has been described, but roll correction may be performed by driving the imaging element 111 relative to the imaging optical system 110.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023159, filed Feb. 17, 2021, which is hereby incorporated by reference wherein in its entirety.

The invention claimed is:

1. An imaging device in which an imaging sensor that captures an image and a display that displays the image are provided, the imaging device comprising:
   a processor; and
   a memory storing a program which, when executed by the processor, causes the processor to execute:
      performing roll correction on the image;
      controlling an output of the image; and
      displaying the output image on the display, wherein the performing of roll correction on the image includes performing the roll correction such that a degree of correction of the roll correction when the image is to be output to only the display is less than a degree of correction of the roll correction when the image is to be output to the display and an output destination other than the display.

2. The imaging device according to claim 1, wherein the performing of roll correction on the image includes stopping the roll correction when the image is to be output to only the display.

3. The imaging device according to claim 1, wherein a case in which the image is to be output to the display and an output destination other than the display includes a case in which a predetermined mode is set.

4. The imaging device according to claim 1, wherein the roll correction is performed on the image captured by the imaging sensor, and
wherein the controlling of an output of the image includes performing roll correction on an image to be output to the output destination other than the display and an image to be output to the display such that the degree of correction of the roll correction for the image to be output to the output destination other than the display is higher than that for the image to be output to the display when the image is to be output to the display and the output destination other than the display.

5. The imaging device according to claim 1, wherein the displaying of the output image includes displaying an indication indicating an inclination of the imaging device.

6. The imaging device according to claim 5, wherein the displaying of the output image includes displaying an indication indicating horizontality as the indication indicating the inclination of the imaging device in an overlapping manner.

7. The imaging device according to claim 1, wherein the processor is configured to further execute performing sound collection using one of monaural and stereo, and
wherein the performing of sound collection includes performing the sound collection in stereo when the image is to be output to only the display and performing the sound collection in monaural when the image is to be output to the display and the output destination other than the display.

8. The imaging device according to claim 1, wherein the processor is configured to further execute performing sound collection using one of monaural and stereo, and
wherein the performing of sound collection includes performing the sound collection in stereo when an image is to be output to only the display and switching between the sound collection in monaural and the sound collection in stereo according to an inclination of the imaging device when the image is to be output to the output destination other than the display.

9. The imaging device according to claim 1, wherein the output destination of an image other than the display is a recording medium or an external device.

10. The imaging device according to claim 9, wherein the external device is an electronic device including a display configured to display an image.

11. A control method for an imaging device in which an imaging sensor that captures an image and a display that displays the image are provided, the control method comprising:
determining whether an output destination of an image captured by the imaging sensor is only the display; and controlling a roll correction unit based on a result of the determination,
wherein the controlling the roll correction unit includes performing control such that roll correction is not performed when it is determined that the image is to be output to only the display and roll correction is performed when it is determined that the image is to be output to the display and an output destination other than the display.

12. A non-transitory storage medium on which is stored a computer program for causing a computer of an imaging device in which an imaging sensor that captures an image and a display that displays the image are provided to execute a control method, the control method comprising:
determining whether an output destination of an image captured by the imaging sensor is only the display; and controlling a roll correction unit based on a result of the determination,
wherein the controlling the roll correction unit includes performing control such that roll correction is not performed when it is determined that the image is to be output to only the display and roll correction is performed when it is determined that the image is to be output to the display uand an output destination other than the display.

13. An imaging device in which a display that displays an image are provided, the imaging device comprising:
a processor; and
a memory storing a program which, when executed by the processor, causes the processor to execute:
performing roll correction on the image;
controlling an output of the image; and
displaying the output image on the display,
wherein the performing of roll correction on the image includes performing the roll correction such that a degree of correction of the roll correction when the image is to be output to only the display is less than a degree of correction of the roll correction when the image is to be output to the display and an output destination other than the display.

14. The imaging device according to claim 13, wherein the performing of roll correction on the image includes stopping the roll correction when the image is to be output to only the display unit.

15. The imaging device according to claim 13, wherein a case in which the image is to be output to the display unit and an output destination other than the display unit includes a case in which a predetermined mode is set.

16. The imaging device according to claim 13, wherein the roll correction is performed on the image captured by the imaging sensor, and
wherein the controlling of an output of the image includes performing roll correction on an image to be output to the output destination other than the display unit and an image to be output to the display unit such that the degree of correction of the roll correction for the image to be output to the output destination other than the display unit is higher than that for the image to be output to the display unit when the image is to be output to the display unit and the output destination other than the display unit.

17. The imaging device according to claim 13, wherein the output destination of an image other than the display unit is a recording medium or an external device.

18. The imaging device according to claim 17, wherein the external device is an electronic device including a display configured to display an image.

* * * * *